US007057170B2

(12) United States Patent
Freidhoff

(10) Patent No.: US 7,057,170 B2
(45) Date of Patent: Jun. 6, 2006

(54) COMPACT ION GAUGE USING MICROMACHINING AND MISOC DEVICES

(75) Inventor: Carl B. Freidhoff, New Freedom, PA (US)

(73) Assignee: Northrop Grumman Corporation, Los Angeles, CA (US)

( * ) Notice: Subject to any disclaimer, the term of this patent is extended or adjusted under 35 U.S.C. 154(b) by 127 days.

(21) Appl. No.: 10/798,376

(22) Filed: Mar. 12, 2004

(65) Prior Publication Data

US 2005/0199805 A1 Sep. 15, 2005

(51) Int. Cl.
*H01J 49/28* (2006.01)
*B01D 59/44* (2006.01)

(52) U.S. Cl. ...................... 250/294; 250/281; 250/427; 250/299

(58) Field of Classification Search ..................... None
See application file for complete search history.

(56) References Cited

U.S. PATENT DOCUMENTS 5,386,115 A 1/1995 Freidhoff et al.
5,492,867 A 2/1996 Kotvas et al.
5,530,244 A 6/1996 Sriram et al.
5,536,939 A 7/1996 Freidhoff et al.

OTHER PUBLICATIONS

A User's Guide to Vacuum Technology, 2nd Edition, John F. O'Hanlon (1989, John Wiley & Sons), Chapter 5, pp. 75-99.
Building Scientific Apparatus—A Practical Guide to Design and Construction , 2nd Edition, John H. Moore et al., (1989, Addison-Wesley Publishing Company, Inc.), pp. 80-83.
Micromachined Devices and Components, Proc SPIE, vol. 3514, "Comparison of Bulk- and Surface- Micromachined Pressure Sensors", William P. Eaton et al., p. 431.

*Primary Examiner*—Nikita Wells
(74) *Attorney, Agent, or Firm*—Birch, Stewart, Kolasch & Birch, LLP

(57) ABSTRACT

A solid state compact ion gauge includes an electron source, a gate electrode, an electron collector, a gas ionizer, an ion anode, and a detector all formed within a cavity of a semiconductor substrate formed of two halves bonded together and having open sides for receiving a gase sample. A sample of gas having multiple gas constituents flows into the cavity from the side where gas molecules collide with electrons flowing from the source to the collector forming ions. The ions are forced under an electric field to the detector which includes a set of detectors for sensing the constituent ions.

20 Claims, 5 Drawing Sheets

COMPACT ION GAUGE USING MICROMACHINING AND MISOC DEVICES

BACKGROUND OF THE INVENTION

1. Field of the Invention

This invention relates to a gas-detection sensor and more particularly to a solid state compact ion gauge which is micro-machined on a semiconductor substrate.

2. Background Information

Various devices are currently available for determining the quantity and type of molecules present in a gas sample. One such device is the mass-spectrometer.

Mass-spectrometers determine the quantity and type of molecules present in a gas sample by measuring the mass-to-charge ratio and quantity of ions formed from the gas through an ionization method. This is accomplished by ionizing a small sample and then using electric and/or magnetic fields to find a charge-to-mass ratio of the ion. Current mass-spectrometers are bulky, bench-top sized instruments. These mass-spectrometers are heavy (100 pounds) and expensive. Their big advantage is that they can be used to sense any chemical species.

Another device used to determine the quantity and type of molecules present in a gas sample is a chemical sensor. These can be purchased for a low cost, but these sensors must be calibrated to work in a specific environment and are sensitive to a limited number of chemicals. Therefore, multiple sensors are needed in complex environments.

One of the methods utilized to determine the nature of a molecular species is to determine its molecular weight. This is not a unique property of a molecule, since the same set of atoms that constitute a molecule can be bonded together in a variety of ways to form molecules with differing toxicities, boiling points, or other properties. Therefore, in order to uniquely identify a particular molecular compound, the structure must be identified. A well-established technique for determining the molecular structure of molecules is the dissociative ionization of molecules and then determining the quantity and mass to charge ratio of the resulting ion fragments, also known as the cracking pattern. The general technique is referred to as mass spectroscopy.

To determine the mass to charge ratio of an ion, a variety of methods are utilized which causes a separation of the ions either by arrival at a detector over a period of time, or by causing a physical displacement of the ions. The number of detectors simultaneously used determines the speed and sensitivity of the device. Techniques that scan the ion beam over a single detector are referred to as mass-spectrometers and those that utilize multiple detectors simultaneously are referred to as mass-spectrographs. Mass-spectrographs can also be scanned by utilizing an array that covers a subset of the full range of mass to charge ratios; scanning multiple subsets allows coverage of the entire mass range. In order to provide a micro-miniature mass-spectrograph, there is a need for a micro-miniature mass separator that can be used in that micro-miniature mass-spectrograph.

Typically, a solid state mass spectrograph can be implemented on a semiconductor substrate. FIG. 1 illustrates a functional diagram of such a mass spectrograph 1. This mass spectrograph 1 is capable of simultaneously detecting a plurality of constituents in a sample gas. This sample gas enters the spectrograph 1 through dust filter 3 that keeps particulate from clogging the gas sampling path. This sample gas then moves through a sample orifice 5 to a gas ionizer 7 where it is ionized by electron bombardment, energetic particles from nuclear decays, or in a radio frequency induced plasma. Ion optics 9 accelerate and focus the ions through a mass-filter 11. The mass-filter 11 applies a strong electromagnetic field to the ion beam. Mass-filters that utilize primarily magnetic fields appear to be best suited for the miniature mass-spectrograph since the required magnetic field of about 1 Tesla (10,000 gauss) is easily achieved in a compact, permanent magnet design. Ions of the sample gas that are accelerated to the same energy will describe circular paths when exposed in the mass-filter 11 to a homogenous magnetic field perpendicular to the ion's direction of travel. The radius of the arc of the path is dependent upon the ion's mass-to-charge ratio. The mass-filter 11 is preferably a Wien filter in which crossed electrostatic and magnetic fields produce a constant velocity-filtered ion beam 13 in which the ions are disbursed according to their mass/charge ratio in a dispersion plane that is in the plane of FIG. 1.

A vacuum pump 15 creates a vacuum in the mass-filter 11 to provide a collision-free environment for the ions. This vacuum is needed in order to prevent error in the ion's trajectories due to these collisions.

The mass-filtered ion beam is collected in an ion detector 17. Preferably, the ion detector 17 is a linear array of detector elements that makes possible the simultaneous detection of a plurality of the constituents of the sample gas. A microprocessor 19 analyses the detector output to determine the chemical makeup of the sampled gas using well-known algorithms that relate the velocity of the ions and their mass. The results of the analysis generated by the microprocessor 19 are provided to an output device 21 which can comprise an alarm, a local display, a transmitter and/or data storage. The display can take the form shown at 21 in FIG. 1 in which the constituents of the sample gas are identified by the lines measured in atomic mass units (AMU).

Preferably, mass spectrograph 1 is implemented in a semiconductor chip 23 as illustrated in FIG. 2. In the preferred spectrograph 1, chip 23 is about 20 mm long, 10 mm wide and 0.8 mm thick. Chip 23 comprises a substrate of semiconductor material formed in two halves 25*a* and 25*b* that are joined along longitudinally extending parting surfaces 27*a* and 27*b*. The two substrate halves 25*a* and 25*b* form at their parting surfaces 27*a* and 27*b* an elongated cavity 29. This cavity 29 has an inlet section 31, a gas ionizing section 33, a mass filter section 35, and a detector section 37. A number of partitions 39 formed in the substrate extend across the cavity 29 forming chambers 41. These chambers 41 are interconnected by aligned apertures 43 in the partitions 39 in the half 25*a* that define the path of the gas through the cavity 29. Vacuum pump 15 is connected to each of the chambers 41 through lateral passages 45 formed in the confronting surfaces 27*a* and 27*b*. This arrangement provides differential pumping of the chambers 41 and makes it possible to achieve the pressures required in the mass filter and detector sections with a miniature vacuum pump.

The inlet section 31 of the cavity 29 is provided with a dust filter 47 that can be made of porous silicon or sintered metal. The inlet section 31 includes several of the aperture partitions 39 and, therefore, several chambers 41.

FIG. 3 shows the detector array 17 having MOS capacitors 67 which are read by a MOS switch array 69 or a charge coupled device 69. The detector array 17 is connected to an array of Faraday cups formed from a pair of Faraday cup electrodes 71 which collect the ion charge 73.

A cross-section of the all-silicon mass spectrograph 1 is shown in FIG. 4. The top 25*a* and bottom 25*b* silicon pieces are preferably bonded by indium bumps and/or epoxy, which are not shown. The first step in the fabrication of the all-silicon mass spectrograph 1 is the etching of alignment marks in the silicon substrate 25. This assures proper alignment of the etched geometries with the cubic structure of the silicon substrate 25. Once the alignment marks are etched, 40 μm deep chambers 41 are etched in each half 25*a* and 25*b* of the silicon substrate 25. These chambers are etched using an anisotropic etchant such as a potassium hydroxide etching agent or ethylene diamine pyrocatechol (EDP). After the chambers are formed, the orifices between the chambers are formed by etching 10 μm deep features. These orifices are also etched using the anisotropic etching agent.

The miniaturization of mass spectrograph 1 creates various difficulties in the manufacture of such a device.

In any ionic mass spectrometer or charge sensing device, there must be some means to collect the charge and determine its magnitude. For high performance devices, sensitivity of 10's of charges at speeds of 10's of kilocycles is required. An additional resolution constraint is mandated for mass spectrographs: the detector pitch must be smaller than the ion beam while insuring that the ion beam is not missed due to inter detector spacing of non-contiguous detector elements. As detector pitch is reduced, smaller displacements (i.e., better mass resolution in a miniaturized package) can more readily be discerned.

In the present state of the art, charge multiplication devices and high gain current sensors have been utilized. Charge multiplication devices require high voltages (>1000 volts) in order to operate. This is difficult to implement on a silicon chip where voltages are generally less than 100 volts. High gain current amplifiers, often referred to as electrometers, operate at low voltages and can be used to measure total charge. Electrometers typically found in laboratory instruments are useful for currents on the order of 1×10−14 amperes. However, this sensitivity is at the expense of speed, with response time approaching several seconds for these low current values.

Another charge sensor that is typically used for the detection of light and high energy particles is a charge-coupled device (CCD). Photoelectrons generated at a capacitor or charge injection from a high energy particle onto a capacitor are moved by the CCD to a charge sensitive amplifier and converted to a voltage signal which can be sensed. CCDs are capable of sensing low amounts of charge (some as low as 10's of charges per read cycle) with read rates in the 10's of kilocycles, but require a passivating dielectric over the charge storage capacitor to protect the active CCD semiconductor layers from environmental degradation. This dielectric precludes sensing of low energy molecular and atomic ions.

High speed and low charge sensing devices capable of accurately detecting low energy molecular and atomic ions are required to effectively miniaturize ionic gas sensors. Accordingly, there is a need for a solid-state detection for sensing low energy charge particles.

If the reader desires further background information, reference can be made to the following:

A User's Guide to Vacuum Technology, 2nd Edition, by John F. O'Hanlon (1989, John Wiley & Sons), Chapter 5, pp. 75–99;

Building Scientific Apparatus—A Practical Guide to Design and Construction, 2nd Edition, by John H. Moore et al., (1989, Addison-Wesley Publishing Company, Inc.), pp. 80–83;

Micromachined Devices and Components, Proc SPIE, Vol. 3514, p. 431, "Comparison of Bulk- and Surface-Micromachined Pressure Sensors," William P. Eaton et al.

U.S. Pat. No. 5,386,115 to Freidhoff et al., entitled "Solid State Micro-machined Mass Spectrograph Universal Gas Detection Sensor";

U.S. Pat. No. 5,492,867 to Kotvas et al., entitled "Method for Manufacturing a Miniaturized Solid State Mass Spectrograph";

U.S. Pat. No. 5,530,244 to Sriram et al., entitled "Solid State Detector for Sensing Low Energy Charged Particles"; and U.S. Pat. No. 5,536,939 to Freidhoff et al., entitled "Miniaturized Mass Filter."

Each of the noted patents is assigned to the present Assignee and is incorporated herein by reference.

While these patents describe a mass filter that has served its intended purpose, there is still a need to eliminate the mass filter so that a low cost and compact ion gauge can be used in high vacuums and ultra-high vacuums. The use of silicon micromachining and devices allows for a low cost and compact ion gauge. Such a compact ion gauge would provide new capabilities in vacuum process equipment by placing a network of pressure sensors on vacuum tools rather that a single one. With the sensors being networked on a process tool, leak checking and process variability can be reduced which will increase efficiency and process yield.

SUMMARY OF THE INVENTION

The present invention is directed to devices formed by the micromachining of silicon on a chip (MISOC) and more particularly to an ion gauge formed on a chip (MSOC) to provide a new type of spectograph device from a subset of the mass spectrograph components. This will allow for a low cost and compact ion gauge provide new and improved capabilities by placing a network of pressure sensors on the vacuum tools rather than a single one.

In order to utilize a detector array, displacement of the various mass to charge ratio ions in space is conventionally used. Time of flight methods which separate the ions by arrival time at a detector are typically single detector spectrometers. For the present invention, physical separation in space is utilized in order to take advantage of the additional sensitivity gains through integration on an array. Typically, magnetic and/or electrostatic fields can be utilized to cause a separation of the ions in space. Constant magnetic and electrostatic fields cause a fanning of ions in physical space and are amenable to the incorporation of detector arrays.

The mass spectrograph on a chip concept permit some of the components to be configured for other applications, one of these is using the solid-state electron emitter, the micromachined silicon and the CMOS detector array to construct a compact, solid-state ion gauge for high vacuum systems that process semiconductor devices, etc. Another aspect of the MSOC invention is the hybridization of pieces to form the desired shape and size. The sloping walls aid in reducing the x-ray current on the detectors and extend the lower pressure limit of the device.

Further scope of applicability of the present invention will become apparent from the detailed description given hereinafter. However, it should be understood that the detailed description and specific examples, while indicating preferred embodiments of the invention, are given by way of illustration only, since various changes in modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and, thus are not limitative of the present invention, and wherein.

DESCRIPTION OF THE INVENTION

Mass spectrograph on a chip (MSOC) concept permit some of the components to be configured for other applications, one of these is using the solid-state electron emitter, the micromachined silicon and the CMOS detector array to construct a compact, solid-state ion gauge for high vacuum systems that process semiconductor devices.

Another aspect of the MSOC invention is the hybridization of the pieces to form the desired shape and size. The sloping walls aid in reducing the x-ray current on the detectors and extend the device lower pressure limit of the device.

FIGS. 5(*a*) and (*b*) illustrate a pair of opposing primary ion gauge chips 26*a* and 26*b* in accordance with the preferred embodiment of the invention.

Figure 1:
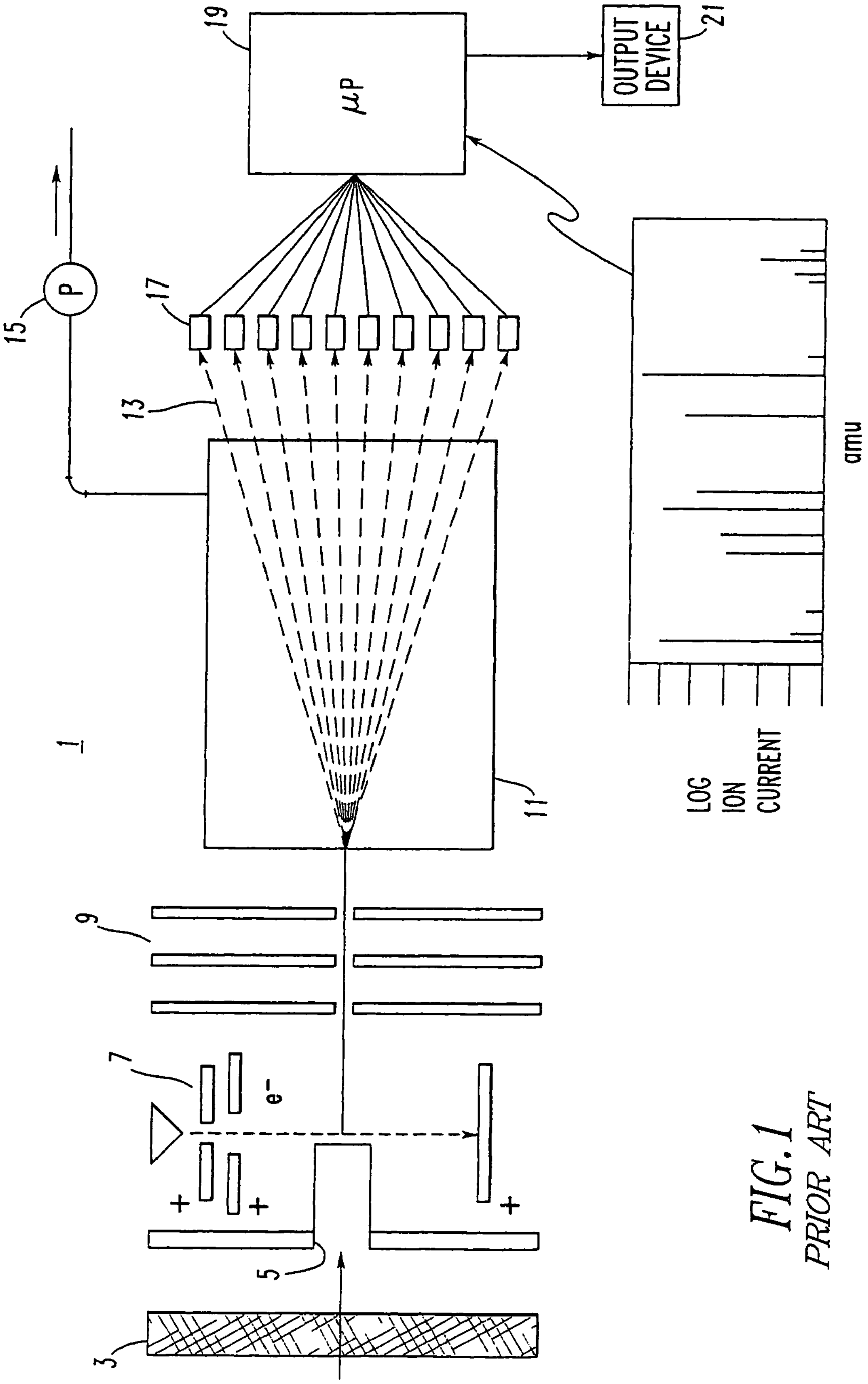
FIG. 1 PRIOR ART
FIG. 1 is a functional diagram of a conventional solid state mass spectrograph.
Figure 2:
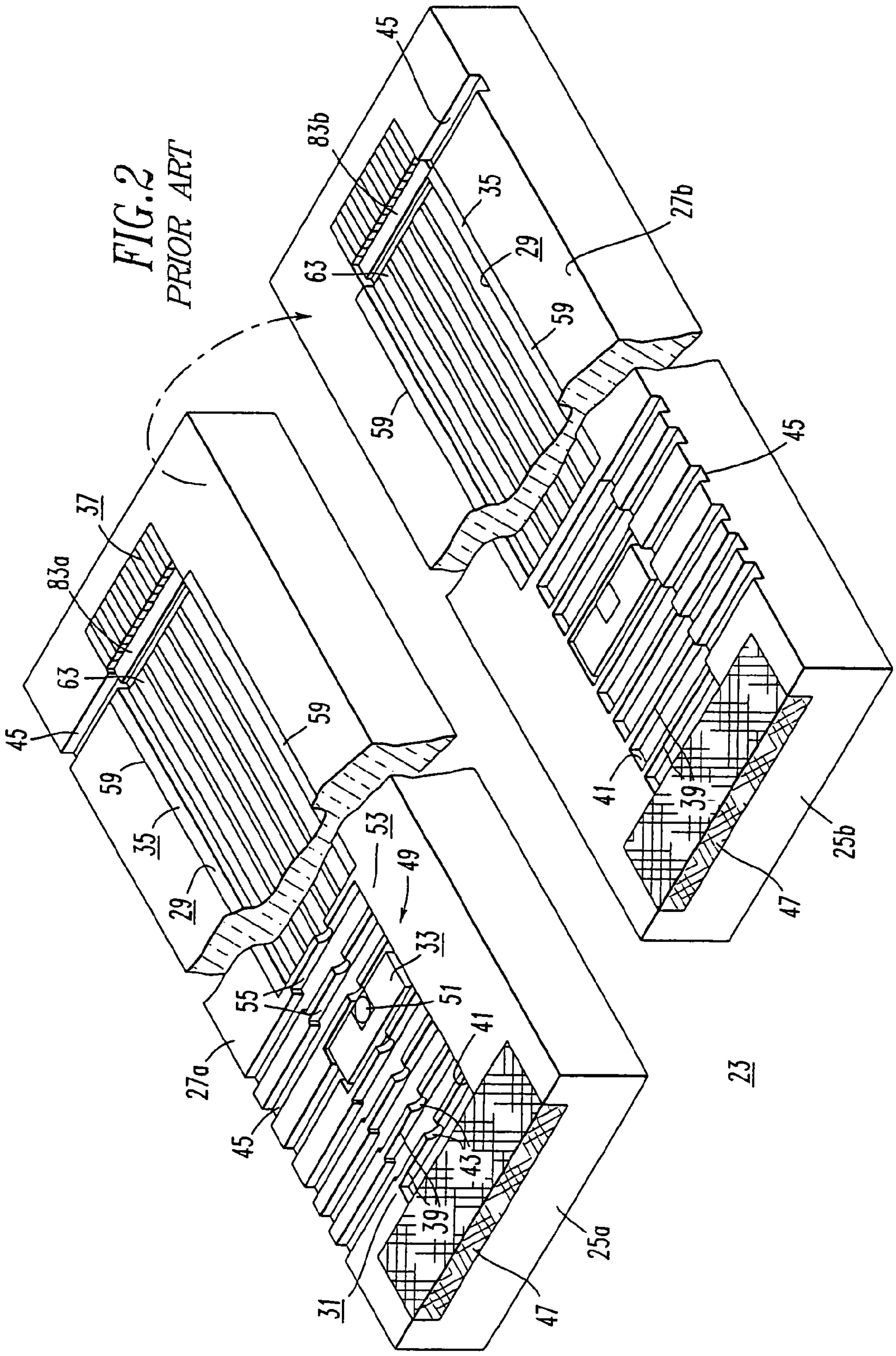
FIG.2 PRIOR ART
FIG. 2 is an isometric view of two halves of the conventional mass spectrograph of FIG. 1 rotated and opened to reveal the internal structure.
Figure 3:
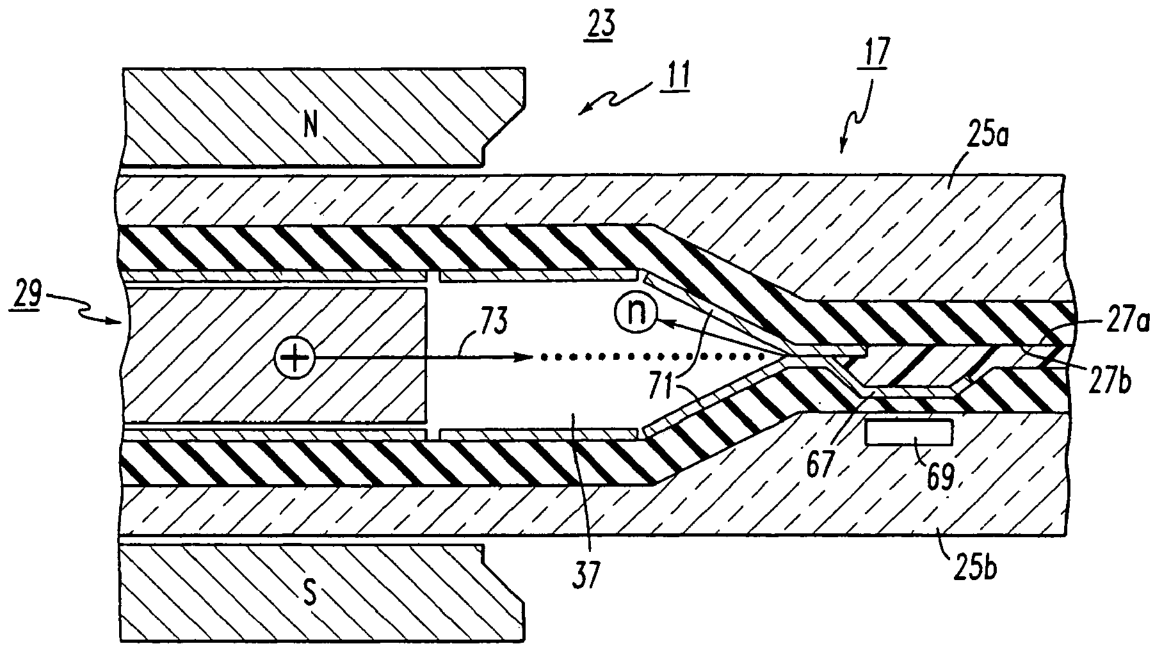
FIG.3 PRIOR ART
FIG. 3 is a longitudinal fractional section through a portion of the conventional mass spectrograph of FIG. 2.
Figure 4:
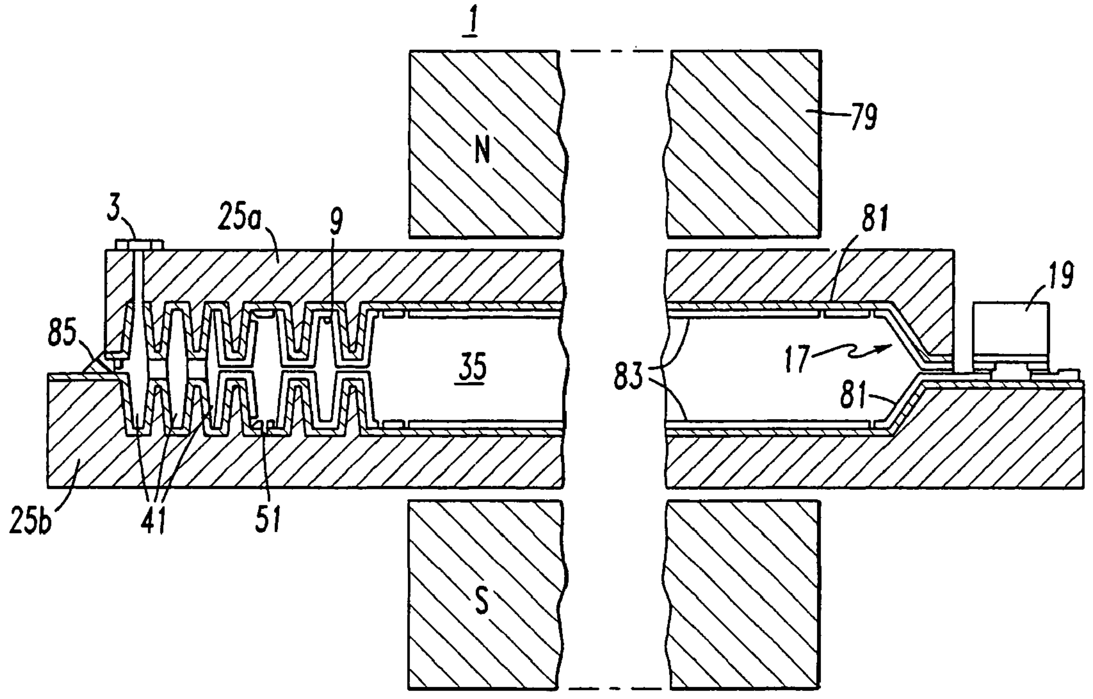
FIG.4 PRIOR ART
FIG. 4 is a schematic cross-sectional view of the conventional mass spectrograph of FIG. 2.
Figure 5A:
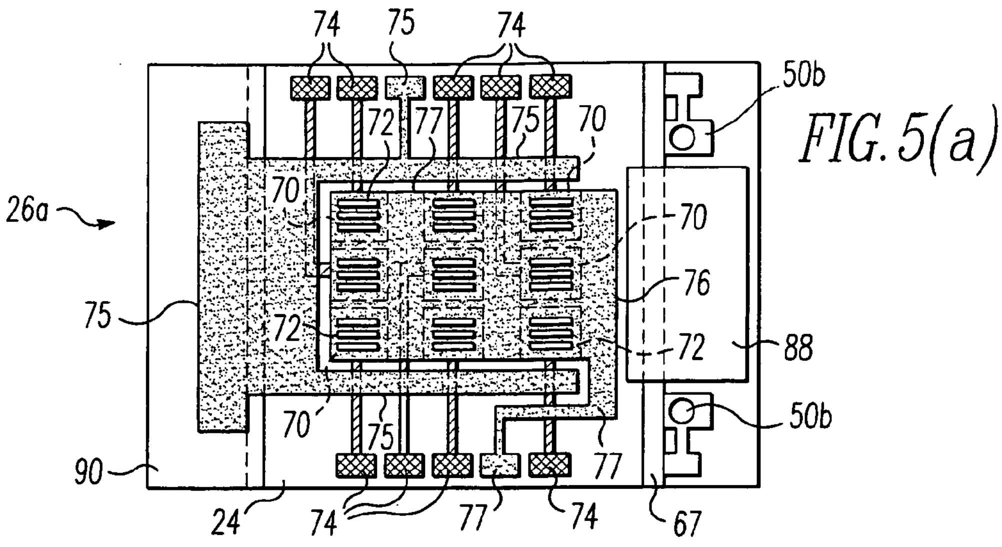
FIGS. 5(*a*) and (*b*) are planar views illustrative of a pair of primary ion gauge chips forming a preferred embodiment of the present invention.
Figure 5B:
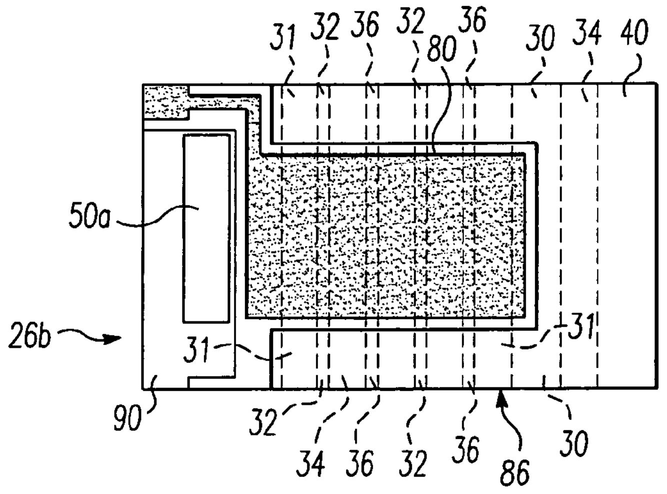
Figure 6A:
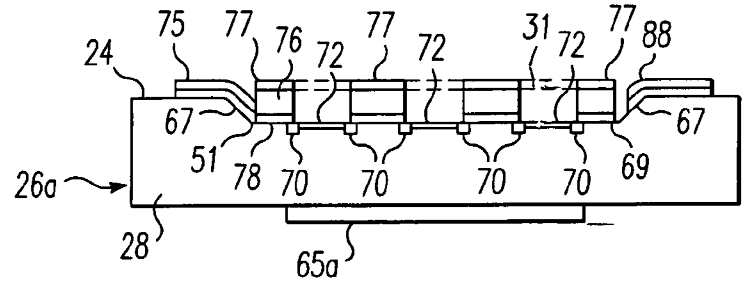
FIGS. 6(*a*) and (*b*) are side planar views of the ion guage chips shown in FIGS. 5(*a*) and (*b*) illustrating the sloped walls that provide detector placement and direct x-rays primarily away form the detectors.

In FIG. 5(*a*), an array of electron sources 70 is shown in a 3×3 configuration. Larger or smaller arrays can be utilized. The electron sources illustrated are reverse bias p-n junctions. Cold cathodes or other electron sources can be utilized. A large current is passed at a shallow p-n junction near the short horizontal set of lines 72 via a reverse bias potential between the emitter cathode pads 74 and an ion anode pad 75 on substrate 28 of an emitter/base chip 26*a* which acts as the p-n junction anode. Due to the ballistic trajectories that the electron current takes in this device, and the very shallow (~100 Å) depth of the p-n junction, a small fraction of the electron current is emitted above the surface 24 of the substrate 28 by overcoming the bulk and surface potentials. A gate electrode 77 is separated from the junction surface 24 by a pair of thin (~1/μm) films 76 and 78 of silicon dioxide as shown in FIG. 6*a* with holes therein above the shallow junction. On top of the oxide is a metal or film that is the gate electrode 77. This electrode is held at a potential of approximately 100 volts higher than the junction surface to accelerate the emitted electrons away from the junction surface 24. An electron collector 80 located in chip 26*b* (FIG. 5*b*) is held at the same potential as the gate electrode 77 and is opposite the chip 26*a* shown in FIG. 5*a*. A composite configuration is shown in FIG. 7*b*.

As the accelerated electrons pass through a gas sample, entering the cavity 81 between the chips 26*a* and 26*b* from the open sides thereof, collisions between the energetic electrons and gas molecules produce positive ions. The ion anode pad bottom 75 in chip 26*a* (see FIG. 5*a*) and ion anode 86, in chip 26*b* (see FIG. 5*b*) are held at a potential slightly higher than the gate electrode 77 so that ions are moved towards the detector pad 88, which are held at a lower potential. An ion deflector 90 of FIG. 5*b* above the detector pads 88 of FIG. 5*a* is held at a potential higher than even the ion anode 86 to direct the ions formed toward the detector pad 88 to increase the efficiency of ion collection. The ion current collected is proportional to the pressure since the gas density is linearly proportional to the pressure.

Figure 6B:
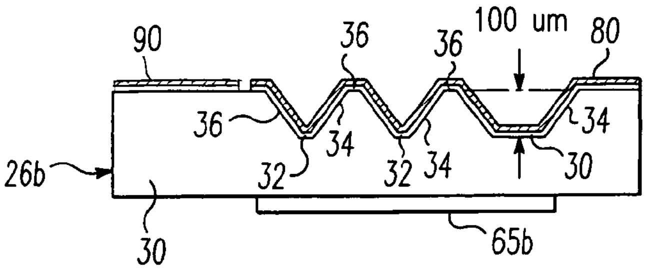

FIGS. 6*a* and 6*b* present side views respectively of the chips 25*a* and 25*b* whose active device views are illustrated respectively in FIGS. 5*a* and 5*b*. The cavity 31 in substrate 28 of the emitter/base chip 26*a* is formed to allow the detector pad 88 to be arrayed on a slope to minimize X-ray generation that would affect the lower pressure detection limit. This cavity 31 can be formed by a number of anisotropic techniques: KOH wet etching is one example. Fifty (50) μm is a typical depth over which five pitched detector arrays can be formed with sufficient resolution. Planar substrates with the detector array mounted at an angle would be equivalent. The segments of magnetic film 65*a* and 65*b* on both (FIGS. 6*a* and 6*b*) located on the exterior surfaces of the substrates 28 and 30 can be formed of any magnetic or magnetizable material. The polarization on emitter/base chip half 26*a* should be the opposite of the collector chip half 26*b* so that a vertical magnetic field B of several to hundreds of gauss is produced in the cavity 81 formed in FIG. 7*b*.

FIG. 6*b* shows etched "V"-shaped grooves 32 formed in the substrate 30 of the chip 26*b* over which is located the metallization of the electron collector 80 and ion anode 86. The "V" groove slopes 32 are aligned orthogonally over top of the emitter arrays 70, shown in FIG. 6(*a*). The magnetic field B (vertically oriented) will confine the electron path and aid in confining the electrons to strike the metallized slope 34 of the grooves 32. A 100 μm depth is a typical depth since low resolution lithography is needed for this device. Flat bottom or fully pointed "V" grooves can be utilized. Substrate 30 of the chip half 26*b* is etched, oxidized and then metallized. No particular requirements for the substrate 30 are needed other than that it can be easily formed with sloping walls 36. Crystalline silicon is one common type of substrate material. The magnetic field B formed by the magnetic film 65*a* and 65*b* causes the electrons to spiral in a tight radius as it moves through the vacuum space. This spiral will increase the effective distance traveled by the electron and therefore a signal (positive ions) will be generated.

Figure 7A:
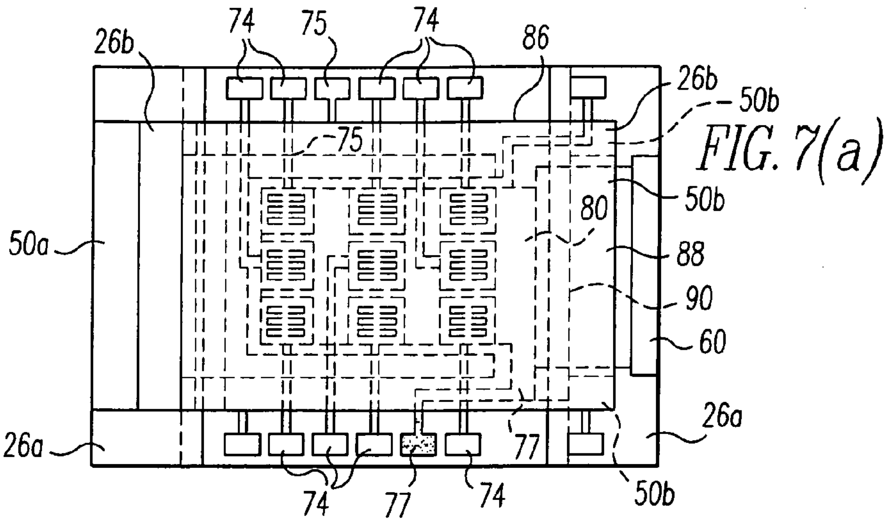
FIGS. 7(*a*) and (*b*) show a composite assembly of a micromachined ion gauge in accordance with the subject invention.
Figure 7B:
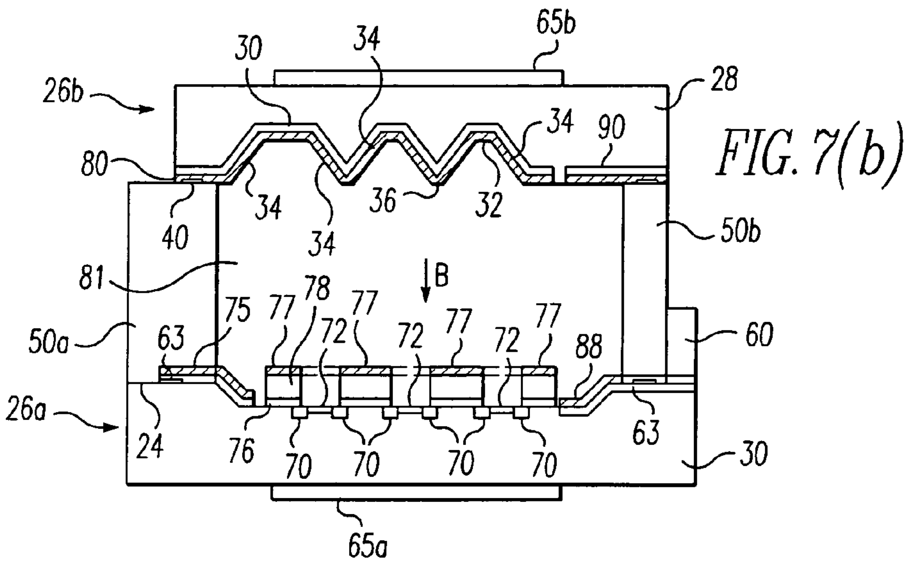

FIGS. 7(*a*) and (*b*) show a composite assembly of the micromachined ion gauge formed from the semiconductor chips 26*a* and 26*b* and conductive spacers 50*a* and 50*b* shown in FIGS. 7(*a*) and 7(*b*).

FIG. 7(*a*) shows a resulting configuration of the ion gauge from the top view with both chips 26*a* and 26*b* in place. For example, FIGS. 6(*b*) and 5(*b*) are inverted and rotated 180° on top of FIGS. 6(*a*) and 5(*a*). A side view is shown in FIG. 7(*b*), after the inversion. The emitter/base 26*a* chip is the large chip whose top view is shown in FIG. 5*a* and side view in FIG. 6*a*. The electron collector chip 26*b* is the chip and its associated parts whose top view (active device part) is shown in FIG. 5(*b*).

Spacers 50*a* and 50*b* are metal or metallized ceramics that hold the emitter/base chip 26*a* and electron collector chip 26*b* apart in an aligned state. The spacers 50*a* and 50*b* also provide electrical connection between the two chips 26*a* and

26*b* so that electrical connections to the next level assembly can be made from the emitter/base chip 26*a* only via a detector readout interface circuit 60 which provides a charge to current conversion or charge to voltage conversion to be done near to the detector array element 88 thereby minimizing noise and maximizing sensitivity. The readout circuit 60 also converts the detector pad array 88 to be readout on a serial line, minimizing the number of connections. Other functions of the detector readout circuit 60 include blooming control. Double correlated sampling is preferably used to minimize electronic drift. The alignment would have the electron beam hitting the sloped sides 34 of the electron collector chip 26*b*.

Figure 8:
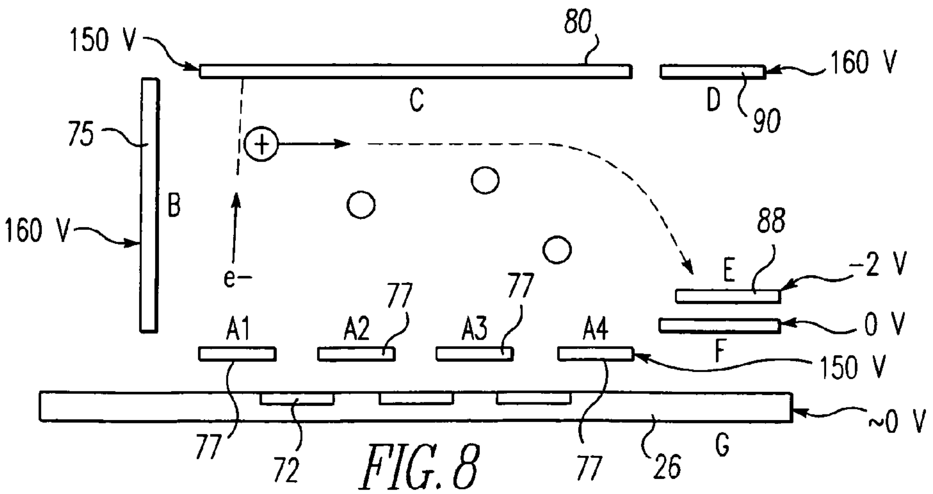
FIG. 8 is an illustration of a nominal voltage scheme for the micromachined ion gauge depicted in FIGS. 7(*a*) and (*b*).

FIG. 8 provides a nominal voltage scheme for the assembly shown in FIG. 7(*b*). Voltages are different here than in the previous discussion and show some of the variation that can be tolerated. The series of electrodes A1, A2, A3 and A4, at 150 V is the same as the gate electrode 77 from FIG. 5(*a*). The electrodes are approximately where they would be on the assembled compact ion gauge as viewed from the side, as shown in FIG. 7(*b*). The "B" electrode is the same as the ion anode 86 and pushes the positive ions formed towards the detector pad "E" which is the same as 88. Electrode "C" is the same as the electron collector electrode 81 (FIG. 5*b*). Electrode "D" is an ion deflection electrode 92 to push the ions down toward detector electrode "E" or 85. Electrode "F" is a ground plane surrounding the detector electrode "E" or 85. Electrode "G" is the substrate 28 of emitter base chip 25*a*.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the appended claims and any and all equivalents thereof.

What is claimed is:

1. A solid state ion gauge for analyzing a sample gas having multiple gas constituents, comprising:

a first and a second mutually opposing substrate of semiconductor material separated a predetermined distance so as to form an elongated intermediate gas ionizing cavity region and including an open side inlet for feeding a sample of gas to be analyzed into said gas ionizing cavity region;

a source of electrons located on a surface of said first substrate facing a surface of said second substrate;

a collector of electrons, opposing said source of electrons, located on said surface of said second substrate;

an ion anode pad located on said surface of the first substrate adjacent said source of electrons;

a gate electrode located in a space between the source of electrons and the collector of electrons;

an ion anode located on the surface of said second substrate adjacent said collector of electrons;

an ion detector located at one end of said first substrate for receiving ions generated in the gas ionizing region when electrons from said source of electrons travel through said sample of gas toward said collector of electrons and collide with molecules of the gas sample;

an ion deflector located on said second substrate for moving ions in the gas ionizing region toward the ion detector; and, first and second magnet elements respectively located on said first and second substrates for generating a magnetic field across and through the gas ionizing region for controlling a travel path of electrons through the ionizing region when generating ions of the gas sample.

2. An ion gauge according to claim 1 wherein said source of electrons comprises a plurality of electron sources.

3. An ion gauge according to claim 2 wherein the plurality of electron sources are arranged in a predetermined pattern.

4. An ion gauge according to claim 1 wherein the plurality of electron sources comprises an emitter array.

5. An ion gauge according to claim 4 wherein the emitter array comprises an array of semiconductor p-n junctions.

6. An ion gauge according to claim 4 wherein the emitter array is of a predetermined size and the gate electrode comprises a layer of electrode material between the emitter array and the collector and having an area substantially equal in size to the size of the emitter array.

7. An ion gauge according to claim 6 wherein the collector of electrons comprises a layer of electrode material substantially equal in size to the size of the emitter array and the gate electrode.

8. An ion gauge according to claim 7 wherein said ion anode pad comprises a layer of electrode material adjacent to and partially surrounding the area of the gate electrode.

9. An ion gauge according to claim 8 wherein said ion anode comprises a layer of electrode material adjacent to and partially surrounding the collector electrode.

10. An ion gauge according to claim 1 wherein the ion detector comprises a plurality of detector pads.

11. An ion gauge according to claim 10 wherein the detector pads are located on a sloped surface of the first semiconductor substrate facing the cavity region.

12. An ion gauge according to claim 10 and additionally including a detector readout circuit located adjacent the detector pad on the first substrate.

13. An ion gauge according to claim 1 wherein the second semiconductor substrate includes a plurality of grooves formed in the surface of said second substrate opposing the source of electrons and containing the collector of electrons therein.

14. An ion gauge according to claim 13 wherein the grooves include substantially flat inclined side walls.

15. An ion gauge according to claim 13 wherein the plurality of grooves comprise a plurality of mutually parallel V-shaped grooves aligned over the source of electrons.

16. An ion gauge according to claim 1 wherein the first and second magnet elements comprise a pair of oppositely poled magnetic films respectively located on an outside surface of said first and second substrates.

17. An ion gauge according to claim 16 wherein said first and second substrates are comprised of silicon.

18. An ion gauge according to claim 1 and additionally including spaced elements for holding the substrates apart in an aligned state.

19. An ion gauge according to claim 1 wherein the first substrate of semiconductor material comprises an emitter base chip and the second substrate of semiconductor material comprises an electron collector chip.

20. An ion gauge according to claim 19 wherein said semiconductor material comprises silicon.

* * * * *